March 13, 1934. J. J. REIMANN ET AL 1,951,063
MANUFACTURE OF FLUTED, CORRUGATED, TWISTED, OR OTHER
LIKE METAL OR OTHER TUBES, RODS, OR BARS
Filed Dec. 27, 1932  2 Sheets-Sheet 2

J. J. Reimann
W. Reimann
INVENTORS

By Marks & Clerk
ATTYS.

Patented Mar. 13, 1934

1,951,063

UNITED STATES PATENT OFFICE 1,951,063

MANUFACTURE OF FLUTED, CORRUGATED, TWISTED, OR OTHER LIKE METAL OR OTHER TUBES, RODS, OR BARS

Jacques John Reimann and William Reimann, Erdington, Birmingham, England

Application December 27, 1932, Serial No. 649,076
In Great Britain January 13, 1932

4 Claims. (Cl. 153—72)

This invention has for its object to provide an improved method of and means for imparting a fluted, corrugated, twisted, or other like configuration to metal or other tubes, rods or bars.

The invention comprises the employment in a drawing or equivalent operation whereby relative longitudinal movement is produced between the workpiece and a shaping die or tool, of a pattern of the required shape, and means for imparting rotary movements to the die in a manner determined by the pattern.

The invention also comprises the combination of a pattern, a follower engaging the pattern, a shaping tool in rotational connection with the follower, means for connecting the work to the pattern, and means for producing longitudinal movements of the pattern and workpiece relatively to the follower and shaping tool.

In the accompanying sheets of explanatory drawings:—

Figure 1:
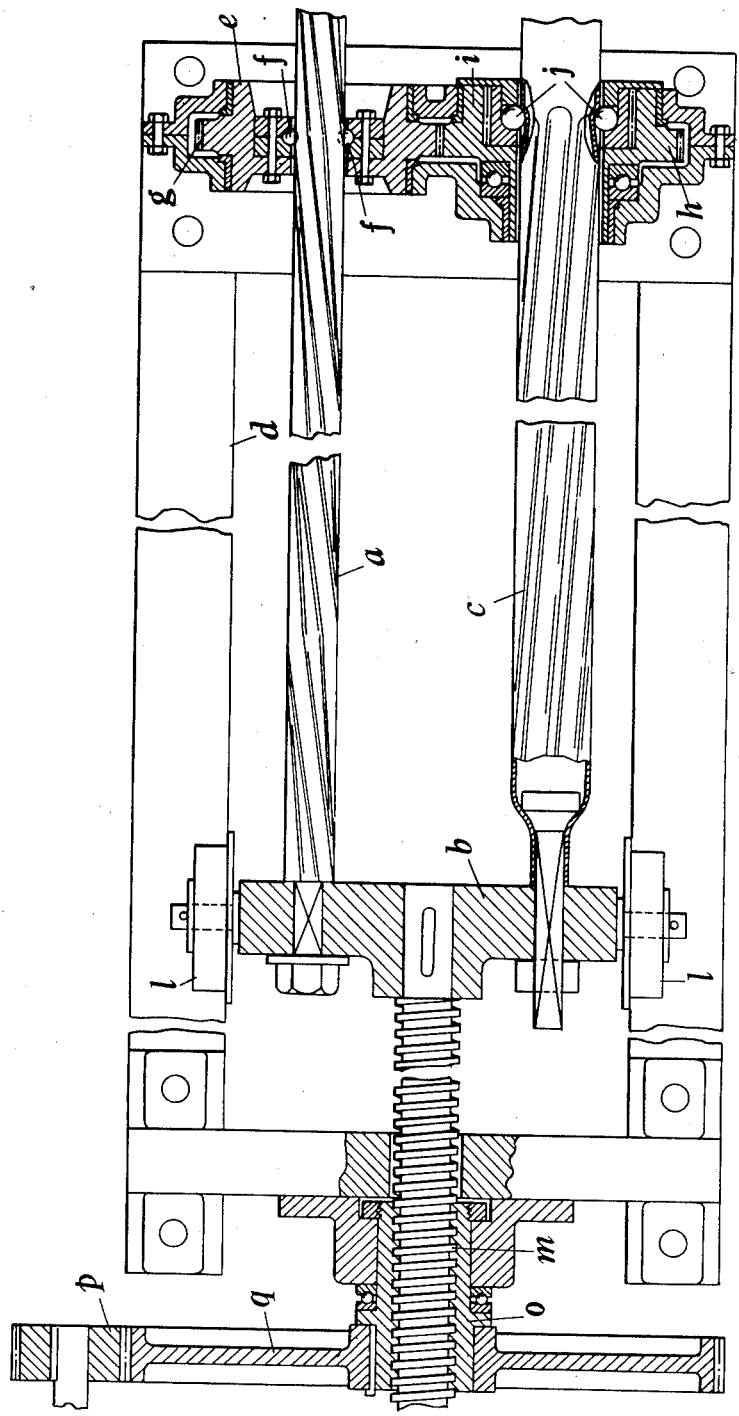
Figure 1 is a sectional plan, and Figure 2 an end view of a machine constructed in accordance with this invention for the making of fluted tubes.
Figure 2:
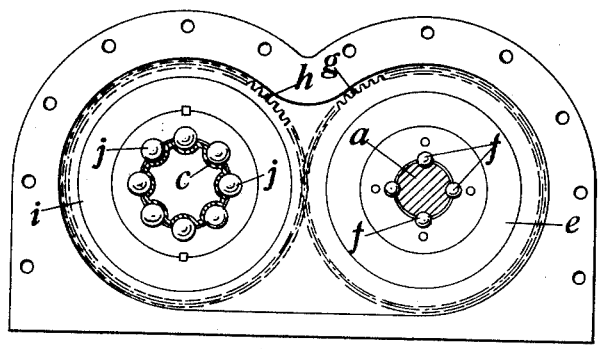

In the machine shown in Figures 1 and 2 for producing helically fluted tubes in accordance with this invention, we employ a pattern consisting of a tube or bar $a$ having its external surface helically or otherwise fluted in the required manner. This is secured at one end to a slidable cross head $b$ to which is also secured one end of the workpiece $c$, the latter being arranged parallel with the pattern. On the bed $d$ of the machine are mounted in a stationary holder a pair of rotary tools. One of them, herein termed the follower, comprises a rotary ring $e$ adapted to fit over the pattern $a$ and provided with balls $f$ which engage the flutes of the pattern, so that when the pattern is moved axially through the follower the latter is caused to rotate in a manner corresponding to the helical configuration of the flutes. The follower is provided externally with gear wheel teeth $g$ engaging similar teeth $h$ around the rotatable shaping tool or die engaging the workpiece. The shaping tool may be of any convenient construction adapted to produce the required flutes in the workpiece. In the example shown the shaping tool comprises a ring $i$ adapted to house a plurality of balls $j$ which latter serve to produce the required flutings in the work piece.

When the pattern and workpiece are moved relatively to the follower and shaping tool, the workpiece is given a cross section determined by the tool and due to the rotation of the tool the flutings in the workpiece also have imparted to them a helical form determined by the pattern.

It will be apparent that the invention enables a variety of different forms to be readily produced. When the flutings are of wavy form, the direction of motion of the follower and shaping tool alternates during the longitudinal movement of the pattern and work piece. When the fluting is of complex form consisting of opposite helices separated by straight portions, the shaping tool remains stationary while the follower engages the straight portions of the pattern.

Figure 3:
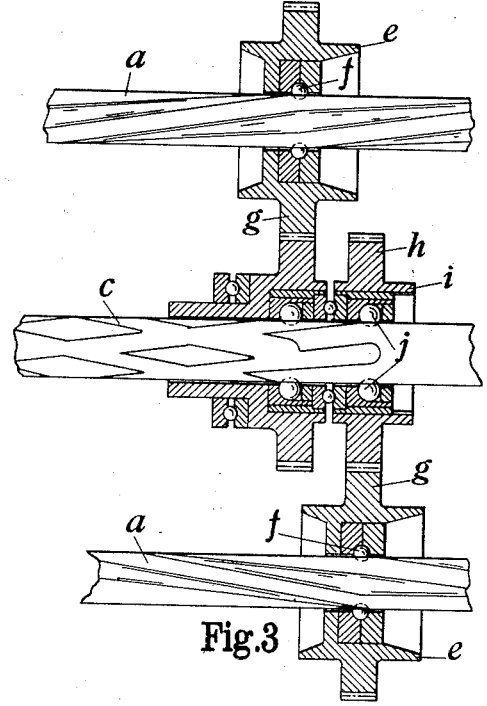
Figure 3 is a plan of a modification in which two patterns are used.

In a modification in which it is required to produce a fluted pattern consisting of two opposite and intersecting helices, we employ an arrangement as shown in Figure 3. The workpiece $c$ is caused to pass through a pair of coaxially arranged shaping tools (each consisting of a ring $i$ and balls $j$) and the toothed ring $h$ of each tool engages a corresponding toothed ring $g$ of a rotary follower comprising a ring $e$ and balls $f$ as already described. Preferably the two followers and the patterns with which they engage are situated on opposite sides of the workpiece as shown in Figure 3. Each pattern corresponds to a part of the configuration which it is required to impart to the workpiece, the shape given to the latter depending on the sum of the effects produced by the separate patterns.

The invention is also applicable to the treatment of bars or rods in a similar manner to that above described. In all cases whilst it is convenient to move the pattern and workpiece by a drawing or pushing action, these parts may be held stationary and longitudinal movement given to the follower and shaping tool. Also other subordinate details may be varied to suit different requirements. In the example illustrated the slide $b$ is supported on the bed $d$ by rollers $l$ and is moved along the bed by a screw $m$, the latter engaging a rotary nut $o$ which is driven by gear wheels $p$, $q$.

Figure 4:
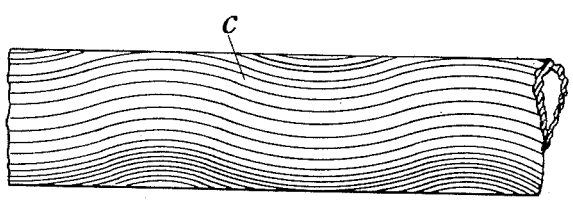
Figures 4 and 5 illustrate two forms of tubes having sinuous or irregular shapes imparted to them by means of our invention.
Figure 5:
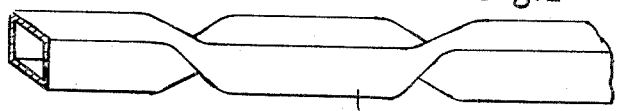

The invention is especially useful when it is required to impart complex shapes to a tube, rod, or bar. A tube initially of circular cross section and having a sinuous fluting imparted to it by our invention is shown in Figure 4, and a tube initially of square cross section and having twists of irregular pattern is shown in Figure 5. In the latter case it will be understood that the movements imparted to the tool correspond to those imparted to the follower by twists in the pattern, and thus the tool will produce corresponding twists in the workpiece.

Having thus described our invention what we claim as new and desire to secure by Letters Patent is:—

1. Means for use in the manufacture of tubes, bars and other elongated objects, the said means comprising the combination of a pattern, a follower engaging the pattern, a shaping tool in rotational connection with the follower, means for connecting the workpiece to the pattern, and means for producing longitudinal movements of the pattern and workpiece relatively to the follower and shaping tool.

2. Means for use in the manufacture of tubes, bars and other elongated objects, the said means comprising the combination of a pattern, means for connecting the workpiece to the pattern, a rotary follower in engagement with the pattern, a rotary shaping tool for acting on the workpiece, means for producing longitudinal movements of the pattern and workpiece relatively to the follower and shaping tool and means for imparting rotary motion from the follower to the shaping tool.

3. In means as claimed in claim 2 for shaping tubes, bars and other elongated objects, the combination of a plurality of shaping tools, a plurality of followers, and a pattern engaging each of the followers, substantially as described.

4. Means for use in the manufacture of tubes, bars and other elongated objects, the said means comprising a rotary tool for shaping the workpiece, means for producing relative longitudinal movement between the workpiece and the tool, a pattern for defining the shape to be imparted to the workpiece, and means for imparting rotary movements to the tool in a manner determined by the shape of the pattern.

JACQUES JOHN REIMANN.
WILLIAM REIMANN.